United States Patent [19]

Noro et al.

[11] 4,389,882
[45] Jun. 28, 1983

[54] METHOD AND APPARATUS FOR DETERMINING AN ABNORMALITY IN A VALVE ACTUATING SYSTEM OF AN INTERNAL COMBUSTION ENGINE

[75] Inventors: Shuhei Noro, Aichi; Tadashi Naito, Toyota, both of Japan

[73] Assignee: Toyota Jidosha Kabushiki Kaisha, Toyota, Japan

[21] Appl. No.: 265,071

[22] Filed: May 19, 1981

[30] Foreign Application Priority Data
Jun. 5, 1980 [JP] Japan ................................. 55-75846

[51] Int. Cl.³ .......................................... G01M 15/00
[52] U.S. Cl. .................................. 73/118; 33/174 P
[58] Field of Search .................. 73/116, 118, 117.2; 33/174 P, 180 AT, 181 AT; 364/551

[56] References Cited
U.S. PATENT DOCUMENTS 2,763,066 9/1956 Garrison .......................... 33/174 P
2,827,710 3/1958 Campbell ........................ 33/180 AT Primary Examiner—Jerry W. Myracle
Attorney, Agent, or Firm—Kenyon & Kenyon

[57] ABSTRACT

Valve lifts are measured with a reference engine assembled correctly, at at least two crank angles, and the relationship between the crank angle and the valve lifts is memorized in an arithmetic unit. Thereafter, the crank shaft of an engine, the valve actuating system of which is to be examined, is indexed at the above-mentioned crank angles in the assembled state of the engine, and the valve lifts are measured at these crank angles. The measured data are delivered to the arithmetic unit which performs an arithmetic operation to determine whether there is any abnormality in the valve actuating system and to make the display of the result of the determination.

7 Claims, 8 Drawing Figures

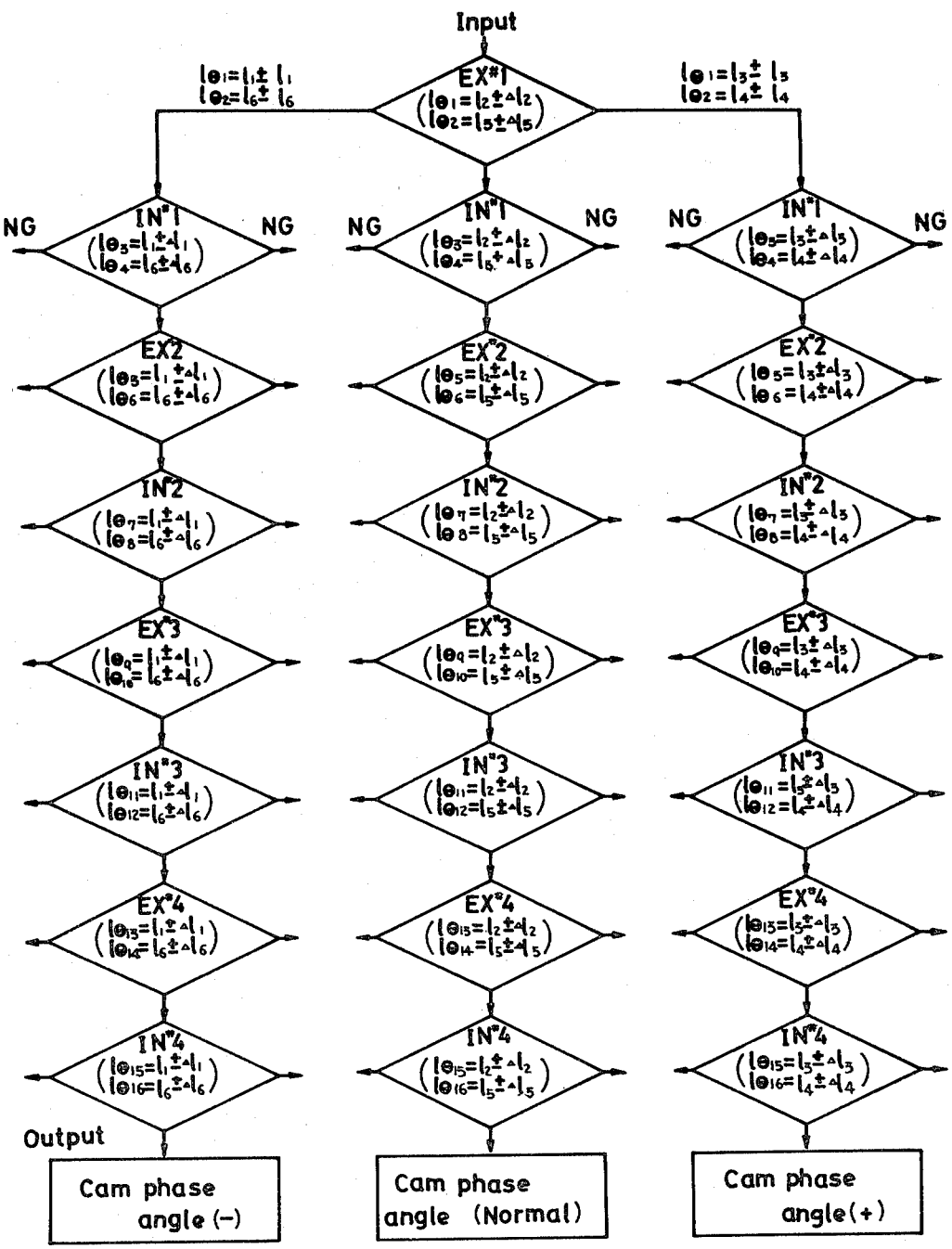

METHOD AND APPARATUS FOR DETERMINING AN ABNORMALITY IN A VALVE ACTUATING SYSTEM OF AN INTERNAL COMBUSTION ENGINE

This invention relates to a method and apparatus for determining an abnormality in a valve actuating system of an internal combustion engine.

Description of the Prior Art

As is known, the inspection of a valve actuating system of an internal combustion engine is usually made during the mounting of the valve actuating system on the engine. That is, the parts of the valve actuating system are usually successively fitted and mounted while being checked for any defect or abnormality. However, no method has hitherto been known for determining an abnormality in the valve actuating system, such as valve clearance, cam profile, cam phase angle and so forth, in the assembled state of the engine. However, in order to have the parts precisely mounted, it is necessary for precision to be maintained in the subsequent steps of the assembling process. More strictly, it is preferred that the state of the valve actuating system be checked after mounting, i.e. in the assembled state of the valve actuating system. Checking of the valve actuating system in the assembled state is also preferred from the view point of efficiency of the assembling work.

Unfortunately, no apparatus has been known which fulfills such an aim.

BRIEF SUMMARY OF THE INVENTION

Accordingly, it is an object of the invention to provide a method and apparatus for determining an abnormality in a valve actuating system of an internal combustion engine in the assembled state of the valve actuating system.

It is another object of the invention to check the state of a valve actuating system in the final state of assembling, irrespective of the intermediate state of the assembling.

It is another object of the invention to improve the precision of a checking operation for determining abnormalities in a valve actuating system of an internal combustion engine.

It is still another object of the invention to eliminate the inspection or check of a valve actuating system in the course of assembling an internal combustion engine to improve the efficiency of the assembling work.

It is a further object of the invention to automatically determine the state of assembling of a valve actuating system of an internal combustion engine after indexing of at least two crank angle positions and the valve lifts at such crank positions.

It is a still further object of the invention to simplify the inspection work and reduce the labor involved in inspecting a valve actuating system of an internal combustion engine.

Briefly, the invention provides a method and apparatus for determining an abnormality in a valve actuating system of an internal combustion engine.

The method is comprised of the steps of measuring a valve lift of a correctly assembled reference engine at least two crank angles and memorizing the relationship between each measured valve lift and crank angle in an arithmetic unit. In addition the steps include the indexing of a crank shaft of an engine having a valve actuating system to be checked at the crank angles and the measuring of the valve lifts at these crank angles. The values of the measured valve lifts of the system to be checked are then delivered to the arithmetic unit to determine any abnormalities in the actuating system.

The valve clearance is determined by the measured valve lift values falling within a predetermined measured region. The cam profile is determined by a combination of the measured valve lift values falling within a combination of predetermined measured regions. The cam phase angle is determined by the measured valve lift values of all the valves of the system at the predetermined crank angles falling within a predetermined measured region.

The apparatus comprises a crank angle indexing means having a motor for rotating a crank shaft of an internal combustion engine and a crank angle indexing reference sensor for detecting a crank angle and emitting a signal in response thereto. In addition, the apparatus has a displacement meter for measuring a valve lift upon contact with a valve retainer and emitting a signal in response thereto. Further, the apparatus has an arithmetic unit for making an arithmetic operation to determine the valve clearance, cam profile and cam phase angle for any abnormality in response to the reception of the signals from the indexing means and meter.

The arithmetic unit has a memory section and an operating section. The memory section stores information including a relationship of a valve lift for each of at least two crank angles. The operating section compares a measured valve lift signal with the stored information for each crank angle to produce an output signal in response to the measured valve lift signal falling outside a predetermined region corresponding to the stored information in order to indicate an abnormality in at least one of the valve clearance, cam profile and cam phase angle of the valve actuating system.

These and other objects and advantages of the invention will become more apparent from the following detailed description taken in conjunction with the accompanying drawings in which:

DETAILED DESCRIPTION OF THE DRAWINGS

FIGS. 3b and 3c illustrate flow charts of arithmetic operation circuits;

Figure 4:
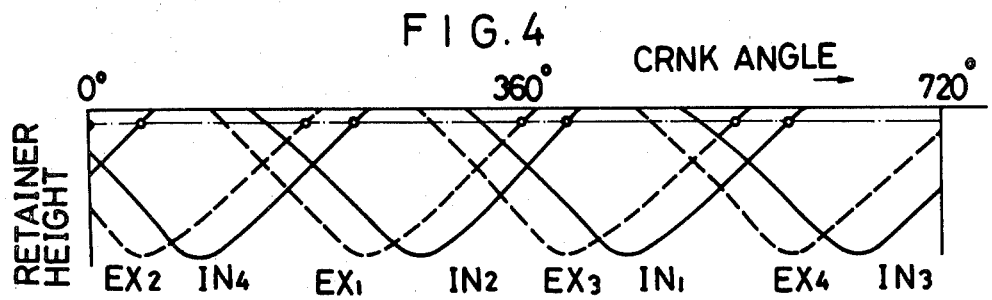
FIG. 4 illustrates a curve showing the valve lift of a four cycle internal combustion engine in which full-line curve shows the exhaust valve lift, while one-dot-and-dash line curve shows the intake valve lift.
Figure 5:
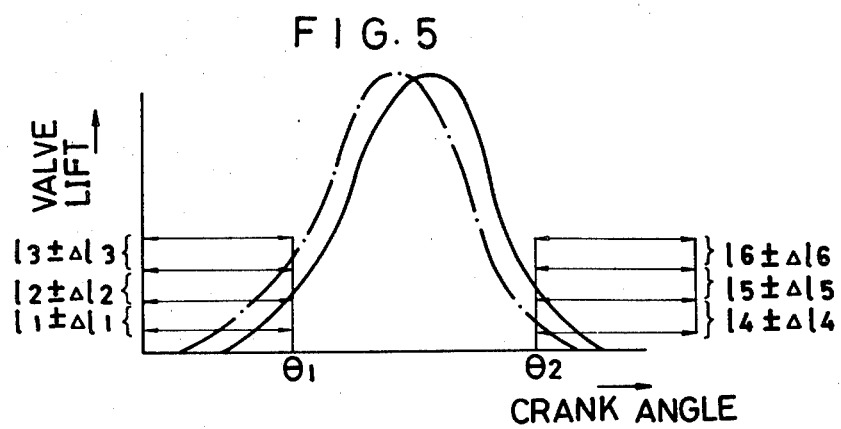
Figure 6:
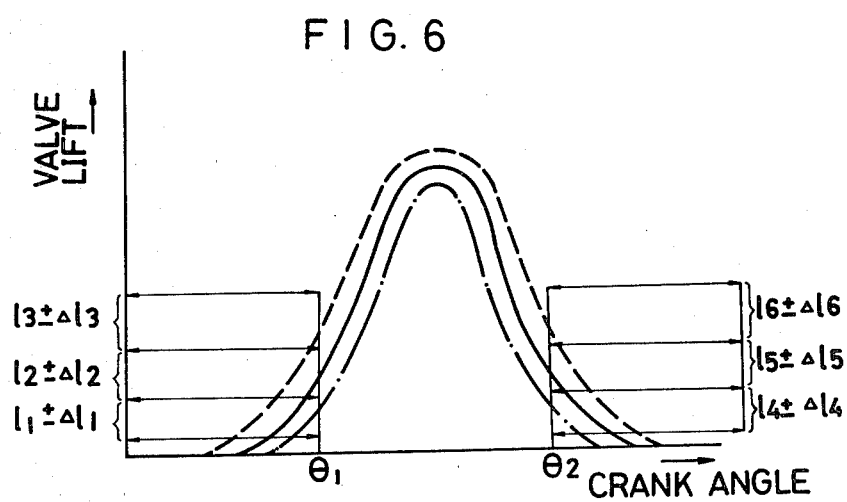

FIG. 5 illustrates a valve lift curve of one of the valves shown in FIG. 4, in which the full-line curve shows the valve lift curve of normal valve, while one-dot-and-dash line shows the valve lift curve of a valve to be examined; and FIG. 6 illustrates a valve lift curve of one of the valves shown in FIG. 4, in which the full-line curve shows the valve lift curve of normal valve, while onedot-and-dash line shows the valve lift curve of a valve to be examined the valve clearance of which is larger than normal one and the dotted line shows the valve lift curve of a valve to be examined the valve clearance of which is smaller than normal one.

DESCRIPTION OF THE PREFERRED EMBODIMENT

Figure 1:
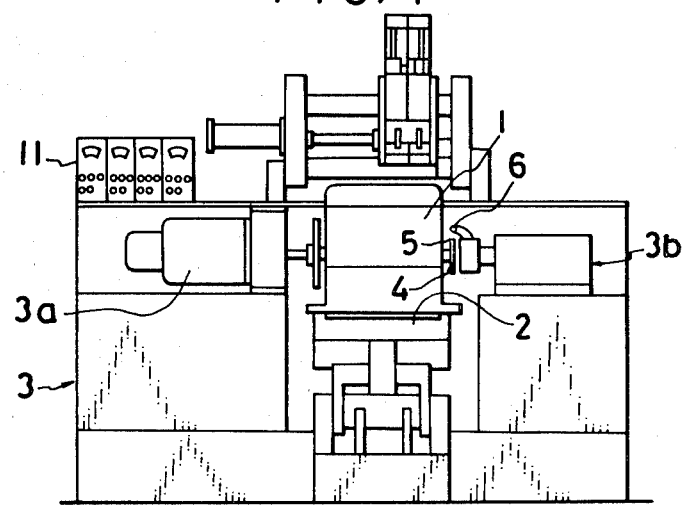
FIG. 1 illustrates a front elevational view of an apparatus used for carrying out the method of the invention for detecting an abnormality in a valve actuating system of an internal combustion engine.

Referring to FIG. 1, the apparatus for checking a valve actuating system of an internal combustion engine 1 employs a pallet 2 on which the engine 1 is mounted and can be lifted to a predetermined inspection position. In addition, the apparatus has a crank angle indexing means 3 with a motor 3a which is coupled directly or indirectly to the engine crank shaft to rotate the shaft and thus index the crank angle. The crank angle indexing means 3 has also a crank angle indexing reference sensor 3b having a displacement meter 6 adapted to detect a V-groove 5 formed in the periphery of a pulley 4 connected to the crank shaft and provided at one side of the engine 1. The displacement meter (gauge) 6 may be the type of device described in the copending application Ser. No. 226,543filed Jan. 21, 1981 SENSING THE PRESENCE AND POSITION. The arrangement is such that it is possible to index the crank angle of the engine 1 at any desired angular position by a cooperation of the motor 3a and the crank angle indexing reference sensor 3b and to emit a signal in response to the detected crank angle.

Figure 2:
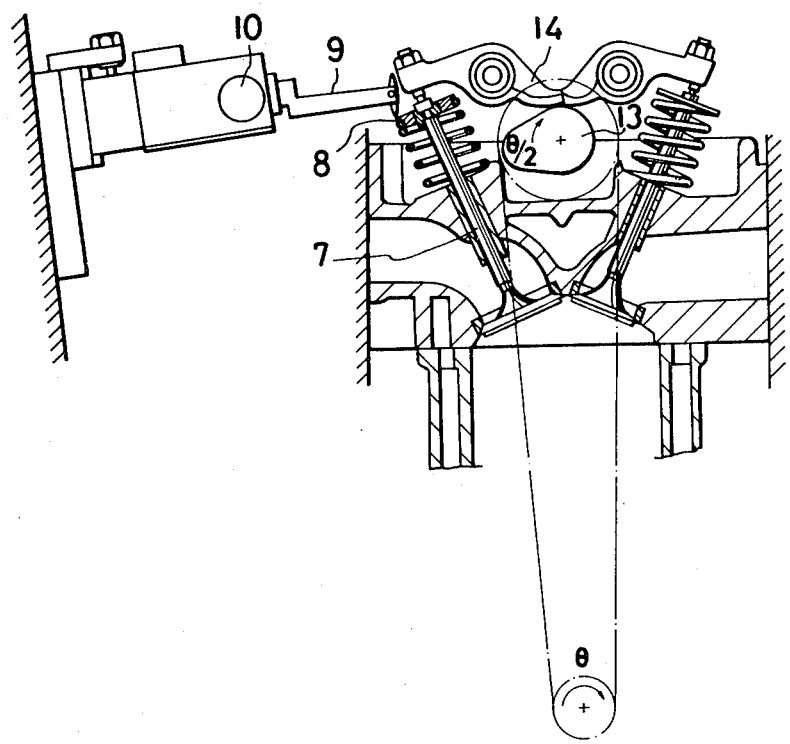
FIG. 2 illustrates a side elevational view of the apparatus shown in FIG. 1, showing particularly the state in the vicinity of a displacement meter.

Referring to FIG. 2, the apparatus also has a displacement meter 10 provided near the portion corresponding to a valve 7 of the engine 1 when the engine is lifted up to the predetermined position. The displacement meter 10 has a contact portion 9 adapted to contact and move in conjunction with the movement of a valve retainer 8. For instance, the contact portion 9 is hinged to the meter 10 and a differential transformer to detect the displacement of the contact portion 9 is built in the meter 10. The displacement meter 10 measures the height of the valve, i.e. the valve lift, through the amount of displacement of the contact portion 9 and emits a signal in correspondence to the amount of valve lift (a measured valve lift valve).

Figure 3A:
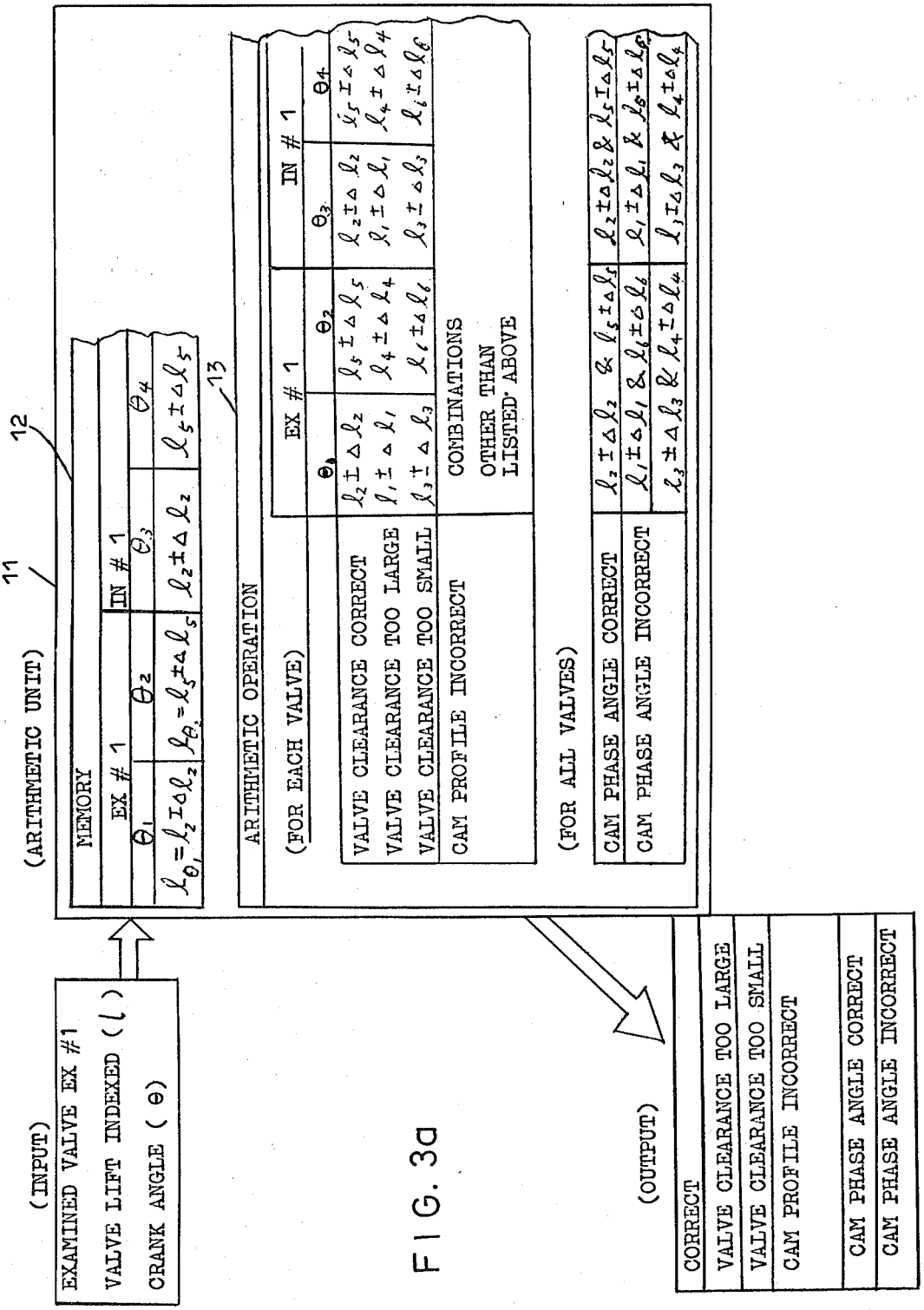
FIG. 3a illustrates a block diagram showing the content of the arithmetic operation performed by an arithmetic unit in accordance with the invention.

The output of the crank angle indexing means 3, as well as the output from the displacement meter 10, are delivered to an arithmetic unit 11 which has, as shown in FIG. 3a, a memory section 12 and an operating section 13. The memory section 12 is adapted to store information such as to which intake or exhaust valve of a multiplicity of valves of the engine the delivered signal pertains, the valve lift of the valve and the indexed crank angle. The operating section 13 makes or performs an arithmetic operation using data, such as the memorized valve No. of the normally assembled valve, valve lift, indexed crank angle, and the valve lift of the valve to be examined of an engine with which the abnormality is to be checked, and produces output signals for the display of information on a suitable display, as shown, concerning any abnormality in the valve clearance, cam profile and cam phase angle.

In use, a reference engine 1 is first prepared. This reference engine 1 is assembled in the correct manner so that the valve clearance, cam profile and the cam phase angle are set correctly. The reference engine 1 is then placed on the pallet 2 and is set at the predetermined inspecting position.

Thereafter, the relationship between the crank angle and the valve lift in the reference engine 1 is determined by making use of a crank angle indexing means 3. The signals corresponding to the valve lifts and crank angles are then delivered to the arithmetic unit 11 and the relationships of the valve lift for each crank angle is obtained by rotating the crank shaft over angular ranges which are offset by suitable angles $\theta_1$, $\theta_2$ from the top dead center mark (not shown) formed on the engine 1 and the V-groove 5 formed at the portion of the pulley 4 attached to the crank shaft end and corresponding to the top dead center. This is achieved by confirming the top dead center by the aforementioned crank angle indexing reference sensor 3b and then rotating the crank shaft over the above-mentioned angular ranges by means of the motor 3a. The valve lift is detected as the height or level of the retainer 8 by means of the displacement meter 10.

FIG. 4 shows valve lift curves, i.e. the relation between the crank angle and the valve lifts, determined in accordance with the above-explained process.

One of these valve lift curves is shown in FIG. 5. More specifically, in FIG. 5, the full-line curve is the valve lift curve of the reference engine assembled correctly. The lift amount is measured at each of at least two crank positions $\theta_1$ and $\theta_2$, and the measured lift amounts are memorized in the arithmetic unit 11 after a cranking. After completion of the memorization, the reference engine is demounted from the inspection apparatus.

Then, the engine to be inspected is placed on the pallet 2 and is set at the inspection position. Subsequently, crank angles are indexed at crank angles $\theta_1$, $\theta_2$, similarly to the above-mentioned process, by using the crank angle indexing means 3.

The valve lift amounts are measured by the displacement meter 10 at these crank angles. In the event that the engine under inspection has a valve lift curve as shown by the dot-and-dash line in FIG. 5, the valve lift measured at the crank angle $\theta_1$ falls within the region of $l_3 \pm \Delta l_3$ while the valve lift measured at the crank angle $\theta_2$ falls within the region of $l_4 \pm \Delta l_4$.

FIG. 6 illustrates a valve lift curve of one of the valves shown in FIG. 4, in which the full-line curve shows the valve lift curve of normal valve, while onedot-and-dash line shows the valve lift curve of a valve to be examined the valve clearance of which is larger than normal one and the dotted lines shows the valve lift curve of a valve to be examined the valve clearance of which is smaller than normal one.

The valve lifts in the engine 1 to be inspected at crank angles of $\theta_1$, $\theta_2$, measured in accordance with the above-explained procedure, are delivered to the arithmetic unit 11 which performs an arithmetic operation to determine whether there is any abnormality in the valve actuating system.

In this arithmetic operation, it is determined that the valve clearance with the valve concerned is correct if the valve lifts at crank angles $\theta_1$, $\theta_2$ fall within the predetermined regions of $l_2 \pm \Delta l_2$ and $l_5 \pm \Delta l_5$, respectively, as shown in FIG. 5. Also, the valve clearance is too large, if the valve lifts are determined to fall within the regions of $l_1 \pm \Delta l_1$ and $l_4 \pm \Delta l_4$, respectively, at crank angles $\theta_1$ and $\theta_2$. Likewise, the valve clearance is too small, when the valve lifts at crank angles $\theta_1$ and $\theta_2$ are determined to fall within the regions of $l_3 \pm \Delta l_3$ and $l_6 \pm \Delta l_6$, respectively.

When the combination of the valve lifts does not come under the above-mentioned combinations, e.g. when the valve lift at the crank angle $\theta_1$ falls within $l_2 \pm \Delta l_2$ while the crank angle $\theta_2$ falls within $l_6 \pm \Delta l_6$, the cam profile is determined to be incorrect. To the contrary, the cam profile is determined as correct when the combination of the valve lifts comes under one of the above-mentioned combinations.

Also, when the valve lifts of all the valves of the engine, i.e. the exhaust valves (EX) and intake valves (IN) at the crank angles $\theta_1$ and $\theta_2$ fall within the ranges of $l_2 \pm \Delta l_2$ and $l_5 \pm \Delta l_5$, respectively, the cam phase angle is determined to be correct. To the contrary, the cam phase angle is determined to be incorrect when the valve lifts of all the valves at the crank angles $\theta_1$ and $\theta_2$ fall within the ranges of $l_1 \pm \Delta l_1$, and $l_6 \pm \Delta l_6$, respectively, or when the valve lifts of all the valves at these crank angles fall within the ranges of $l_3 \pm \Delta l_3$ and $l_4 \pm \Delta l_4$, respectively.

Thus, the dot-and-dash line in FIG. 5 shows a case in which the cam phase angle is incorrect, although the valve clearance and the cam profile are correct.

The information such as whether the valve clearance is correct, too large or too small; whether the cam profile is correct; and whether the cam phase angle is correct are put into display to determine an abnormality in the valve actuating system of an internal combustion engine.

In the above-described method, the valve lifts are measured at two crank angles $\theta_1$ and $\theta_2$. The number of measurement points, however, is not limited to two and the method can be performed by making the measurement at any number of points more than two. Needless to say, the prevision of the measurement is increased in accordance with the increment of the number of the measurement points.

Figure 3B:
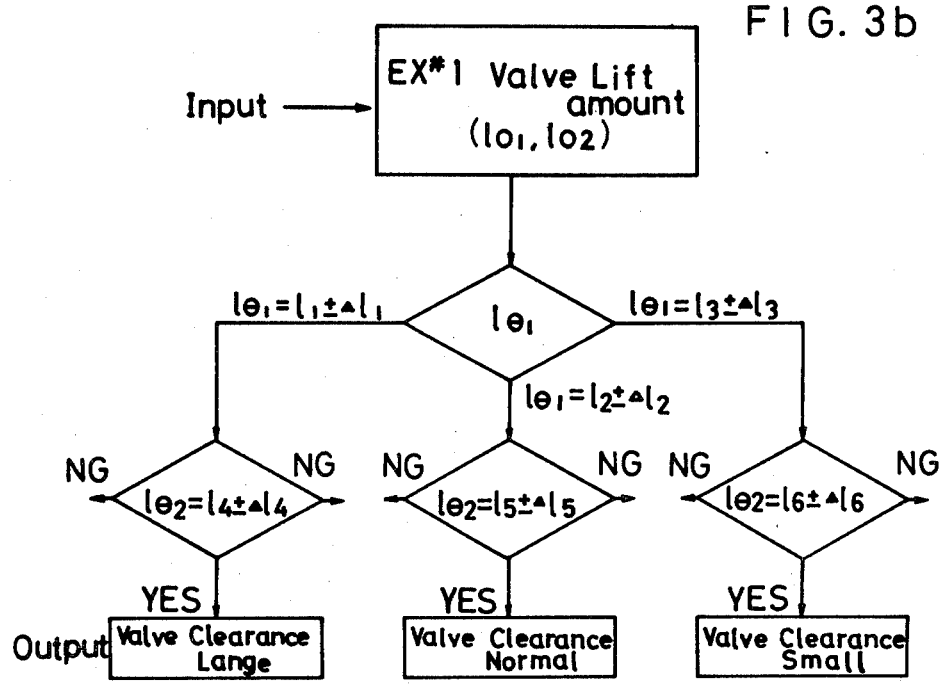
Figure 3B:
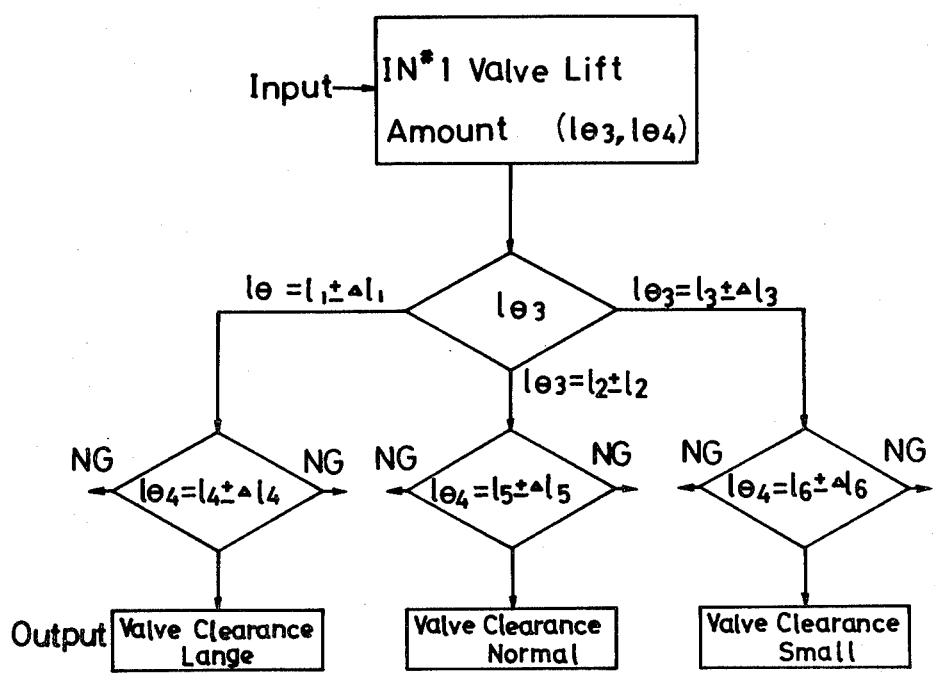

FIGS. 3b and 3c illustrate the arithmetic operation 13 in FIG. 3a in detail.

FIG. 3b is an example of a flow chart of arithmetic operation for deciding as to whether the valve clearance in the exhaust valve $EX_1$ or the intake valve $IN_1$ of the first cylinder of the engine to be checked is correct or not with reference to the valve lifts of the corresponding valve of the reference engine at the crank angle $=\theta_1$ or $\theta_2$. As regards the other valves of the engine, the same or similar arithmetic operation used in the valve $EX_1$ and $IN_1$ to be checked is employed.

FIG. 3c is an example of a flow chart of arithmetic operation for detecting as to whether the cam phase angle in the engine is correct or not.

In FIG. 3b, the valve lift amounts $l_{\theta 1}$ and $l_{\theta 2}$ at the crank angles $\theta_1$ and $\theta_2$ in the exhaust valve ($EX_1$) of the first cylinder of the engine to be checked are inputted to the arithmetic unit 11 in FIG. 3a. First $l_{\theta 1}$ in the $EX_1$ to be checked is compared with $l_{\theta 1}$ in the $EX_1$ of the reference engine so that $l_{\theta 1}$ in the $EX_1$ to be checked is decided as to whether $l_{\theta 1}$ is included in $l_1 \pm \Delta l_1$, $l_2 \pm \Delta l_2$, or $l_3 \pm \Delta l_3$.

When the measured $l_{\theta 1}$ is involved in $l_2 \pm \Delta l_2$, it is decided whether $l_{\theta 2}$ is involved in $l_5 \pm \Delta l_5$. When $l_{\theta 1}$ is involved in $l_2 \pm \Delta l_2$ and $l_{\theta 2}$ is involved in $l_5 \pm \Delta l_5$, a signal indicating that the valve clearance in the $EX_1$ to be checked is correct is displayed in a proper display device 11. When the measured $l_{\theta 1}$ is in $l_2 \pm \Delta l_2$ and the measured $l_{\theta 2}$ is not in $l_5 \pm \Delta l_5$, a NG signal that the corresponding cam profile is incorrect and/or the cam phase angle is incorrect is displayed in the display device.

When $l_{\theta 1}$ is in $l_1 \pm \Delta l_1$, it is decided whether $l_{\theta 2}$ is in $l_4 \pm \Delta l_4$ or not. When $l_{\theta 1}$ is in $l_1 \pm \Delta l_1$ and $l_{\theta 2}$ is in $l_4 \pm \Delta l_4$, a signal indicating that the valve clearance is large is displayed in the display device. When $l_{\theta 1}$ is in $l_1 \pm \Delta l_1$ and $l_{\theta 2}$ is not in $l_4 \pm \Delta l_4$, a NG signal indicating that the corresponding cam profile is incorrect and/or the cam phase angle is incorrect is displayed in the display device.

When $l_{\theta 1}$ is in $l_3 \pm \Delta l_3$, it is decided whether $l_{\theta 2}$ is involved in $l_6 \pm \Delta l_6$ or not. When $l_{\theta 2}$ is in $l_6 \pm \Delta l_6$, a signal indicating that the valve clearance is small is displayed in the display device. When $l_{\theta 1}$ is in $l_3 \pm \Delta l_3$ and $l_{\theta 2}$ is not in $l_6 \pm \Delta l_6$, a NG signal indicating that the corresponding cam profile is incorrect and/or the cam phase angle is incorrect is displayed in the display device.

The other valve in the first cylinder in the engine will be judged as to its valve clearance in the same way as in the case with the $EX_1$.

FIG. 3c is a flow chart of an arithmetic operation for deciding whether or not the phase of the crank shaft is correctly related and set to the phase of the cam shaft. When $l_{\theta 1}$ is in $l_2 \pm \Delta l_2$ and $l_{\theta 2}$ is in $l_5 \pm \Delta l_5$, it is decided as to whether or not $l_{\theta 3}$ and $l_{\theta 4}$ of the valve lift amounts in the exhaust and intake valves of the second cylinder ($EX_2$ and $IN_2$) are involved in $l_2 \pm \Delta l_2$ and in $l_5 \pm \Delta l_5$ respectively. Subsequently, it is decided whether or not the valve lift amounts of the other valves in the engine are involved in the predetermined values as shown in FIG. 3c at the fixed crank angles respectively. When the valve lift amounts of all the valves are involved in the predetermined values at the fixed crank angles, a signal indicating that the cam phase angle is set correctly with respect to the crank angle shaft and it is judged that the cam phase angle is set correctly with respect to the crank angle shaft.

When the valve lift amounts of each valve in the engine are in the ranges of $l_1 \pm \Delta l_1$ and $l_6 \pm \Delta l_6$ at the fixed crank angles respectively, a signal indicating that the cam phase angle is set minus as compared with the normal one.

When the valve lift amounts of each valve in the engine are in the ranges of $l_3 \pm \Delta l_3$ and $l_4 \pm \Delta l_4$ at the fixed crank angles respectively, a signal indicating that the cam phase angle is set plus as compared with the normal one.

In the left row in FIG. 3c indicating that the cam phase angle is set minus as compared with the normal one, if the valve lift amount of a certain valve in the engine at the fixed angle is not in the predetermined value of $l_1 \pm \Delta l_1$ or $l_6 \pm \Delta l_6$ at this crank angle, a NG signal indicating that the cam profile or the valve clearance of this valve is incorrect and/or the corresponding cam profile of the valve is incorrect is displayed in the display device. Same thing can be said with respect to the middle and right rows in FIG. 3c.

The invention offers various advantages. For example, the inspection of the valve actuating system of the engine is coducted in the assembled state. Thus, the system can be examined in the final state irrespective of the intermediate state of the assembling process. It is therefore possible to improve the precision of the inspection, as well as the efficiency of the assembling work.

The insepection itself is made simple only by indexing the crank angle at at least two angular positions and measuring the valve lifts at these crank angles. Thereafter, the arithmetic unit automatically performs an arithmetic operation to determine whether the sate of the assembly of the valve actuating system is correct and to make a display of the result of the determination. Thus, the inspection work is simplified and the labor is reduced.

In the described embodiment, the axis of the abscissa of the coordinate showing the valve lift curve represents the angular position of the crank angle. This crank angle, needless to say, may be substituted by the angular position of the cam, without being accompanied by the degradation of the function.

What is claimed is:

1. A method of determining an abnormality in a valve actuating system of an internal combustion engine, said method comprising the steps of
   measuring a valve lift of a correctly assemblied reference engine at at least two crank angles;
   memorizing the relationship between each measured valve lift and crank angle in an arithmatic unit;
   thereafter indexing a crank shaft of an engine having a valve actuating system to be checked at said crank angles and measuring the valve lifts at said crank angles of said crank shaft; and
   delivering the values of the measured valve lifts of the system to be checked to said arithmetic unit to determine any abnormality in said system to be checked.

2. A method of determining an abnormality in a valve actuating system of an internal combustion engine, said method comprising the steps of
   measuring a valve lift of a correctly assembled reference engine at at least two crank angles;
   memorizing the relationship between each measured valve lift and crank angle in an arithmetic unit;
   thereafter indexing a crank shaft of an engine having a valve actuating system to be checked at said crank angles and measuring the valve lifts at said crank angles of said crank shaft to obtain a measured valve lift value at each said crank angle;
   delivering the measured valve lift values to said arithmetic unit for comparison with the memorized relationship therein to determine any abnormality in the valve actuating system.

3. A method as set forth in claim 2 wherein a valve clearance in the valve actuating system being checked is determined by the measured valve lift values falling within a predetermined measured region.

4. A method as set forth in claim 2 wherein a cam profile in the valve actuating system being checked is determined by a combination of the measured valve lift values falling within a combination of predetermined measured regions.

5. A method as set forth in claim 2 wherein a cam phase angle in the valve actuating system being checked is determined by the measured valve lift values of all valves of the system at said crank angles falling within a predetermined measured region.

6. An apparatus for determining an abnormality in a valve actuating system of an internal combustion engine, said apparatus comprising
   a crank angle indexing means having a motor for rotating a crank shaft of an internal combustion engine and a crank angle indexing reference sensor for detecting a crank angle and emitting a signal in response thereto;
   a displacement meter for measuring a valve lift upon contact with a valve retainer and emitting a signal in response thereto; and
   an arithmetic unit for making an arithmetic operation to determine the valve clearance, cam profile and cam phase angle for any abnormality in response to the reception of the signals from said indexing means and said meter.

7. An apparatus for determining an abnormality in a valve actuating system of an internal combustion engine, said apparatus comprising
   a crank angle indexing means having a motor for rotating a crank shaft of an internal combustion engine and a crank angle indexing reference sensor for detecting a crank angle and emitting a signal in response thereto;
   a displacement meter for measuring a valve lift upon contact with a valve retainer and emitting a signal in response thereto; and
   an arithmetic unit having a memory section for storing information including a relationship of a valve lift for each of at least two crank angles and an operating section to receive said signals from said indexing means and said meter for comparing a measured valve lift signal with the stored information for each crank angle to produce an output signal in response to said measured valve lift signal falling outside a predetermined region corresponding to the stored information to indicate an abnormality in at least one of the valve clearance, cam profile and cam phase angle of the valve actuating system.

* * * * *

UNITED STATES PATENT AND TRADEMARK OFFICE
CERTIFICATE OF CORRECTION

PATENT NO. : 4,389,882
DATED : June 28, 1983
INVENTOR(S) : Shuhei Noro and Tadashi Naito It is certified that error appears in the above—identified patent and that said Letters Patent is hereby corrected as shown below:

Col. 1, line 21, after "engine.", begin a new paragraph.

Col. 3, lines 22-23, after "1981" delete "SENSING THE PRESENCE AND POSITION".

Col. 3, line 43, change "valve" (second occurrence) to --value--.

Col. 6, line 56, correct spelling of "conducted".

Col. 6, line 66, correct spelling of "state".

Col. 7, line 13, correct spelling of "assembled".

Col. 7, line 16, correct spelling of "arithmetic".

Signed and Sealed this

Thirteenth Day of September 1983

[SEAL]

Attest:

GERALD J. MOSSINGHOFF

Attesting Officer    Commissioner of Patents and Trademarks

UNITED STATES PATENT AND TRADEMARK OFFICE
CERTIFICATE OF CORRECTION

PATENT NO. : 4,389,882
DATED : June 28, 1983
INVENTOR(S) : Shuhei Nori and Tadashi Naito It is certified that error appears in the above—identified patent and that said Letters Patent is hereby corrected as shown below:

Change the Name of the Assignee from:

"Toyota Jidosha Kabushiki Kaisha" to

--Toyota Jidosha Kogyo Kabushiki Kaisha--.

*Signed and Sealed this*

*Twenty-second* Day of *November 1983*

[SEAL]

*Attest:*

GERALD J. MOSSINGHOFF

*Attesting Officer* — *Commissioner of Patents and Trademarks*